United States Patent [19]

Sonehara et al.

[11] Patent Number: 5,105,289
[45] Date of Patent: Apr. 14, 1992

[54] REFLECTION TYPE ELECTROOPTICAL DEVICE AND A PROJECTION TYPE DISPLAY APPARATUS USING THE SAME

[75] Inventors: Tomio Sonehara; Chiharu Ito, both of Suwa, Japan

[73] Assignee: Seiko Epson Corporation, Tokyo, Japan

[21] Appl. No.: 465,252

[22] PCT Filed: Jul. 14, 1989

[86] PCT No.: PCT/JP89/00707
§ 371 Date: Aug. 1, 1990
§ 102(e) Date: Aug. 1, 1990

[87] PCT Pub. No.: WO90/00756
PCT Pub. Date: Jan. 25, 1990

[30] Foreign Application Priority Data

| Jul. 14, 1988 | [JP] | Japan | 63-176636 |
| Jan. 19, 1989 | [JP] | Japan | 1-10412 |
| Jan. 19, 1989 | [JP] | Japan | 1-10414 |
| Jun. 16, 1989 | [JP] | Japan | 1-154017 |
| Jul. 7, 1989 | [JP] | Japan | 1-176271 |

[51] Int. Cl.$^5$ ............................................. G02F 1/13
[52] U.S. Cl. ..................................... 359/70; 359/40; 359/72; 359/93; 359/106; 359/63
[58] Field of Search ............... 350/338, 342, 331 R, 350/347 E, 347 R, 334, 336; 359/70, 72, 40, 63, 87, 93, 102, 106

[56] References Cited

U.S. PATENT DOCUMENTS

| 4,019,807 | 4/1977 | Boswell et al. | 350/342 |
| 4,114,991 | 9/1978 | Bleha, Jr. et al. | 350/347 E |
| 4,672,014 | 6/1987 | Joiner et al. | 350/342 |
| 4,697,884 | 10/1987 | Amstutz et al. | 350/334 |
| 4,861,141 | 8/1989 | Nakazawa | 350/334 |
| 4,929,059 | 5/1990 | Takahashi | 350/334 |
| 4,989,076 | 1/1991 | Owada et al. | 350/338 |

FOREIGN PATENT DOCUMENTS

| 57-89724 | 6/1982 | Japan . |
| 0293221 | 12/1987 | Japan | 350/338 |
| 62-299940 | 12/1987 | Japan . |
| 63-115137 | 5/1988 | Japan . |
| 63-271232 | 11/1988 | Japan . |

Primary Examiner—Rolf Hille
Assistant Examiner—Tan Ho
Attorney, Agent, or Firm—Blum Kaplan

[57] ABSTRACT

In a reflection type liquid crystal electrooptical device having a twisted nematic liquid crystal sandwiched between two substrates faced to each other, a linearly polarized incident light enters into the liquid crystal layer and after the reflection in the state of a circularly polarized light, enters into the liquid crystal layer again. As to an outgoing light, twisted angle, $\Delta nd$ and polarized incident angle are fixed so as to rotate the polarized surface at 90° with respect to that of the incident light (the condition of twist angle of 63°, $0.33\lambda \leq \Delta nd \leq 0.47\lambda$, and twist angle of 193°, $0.95\lambda \leq \Delta nd \leq 1.15\lambda$ ($\mu m$) is preferable, wherein the direction of polarizing shaft coincides with the direction of liquid cyrstal molecules.) Whereby, it is possible to use the largest value of $\Delta nd$ so that the thick liquid crystal layer can be used and a wide margin for manufacturing can be also secured. Due to the outgoing light as linearly polarized light, light loss can be prevented in comparison with the case of where the outgoing light is an elliptically polarized light. Further, the improved liquid crystal display device has a sharp electrooptical constant relative to an electric field effect, and having high contrast display can be provided by selecting an optimum twist condition.

16 Claims, 14 Drawing Sheets

REFLECTION TYPE ELECTROOPTICAL DEVICE AND A PROJECTION TYPE DISPLAY APPARATUS USING THE SAME

BACKGROUND OF THE INVENTION

This invention relates to a reflection type electro optical device and a projection type display apparatus using the same. The electro optical device includes a twisted liquid crystal layer and utilizes a birefringence effect of a liquid crystal due to an electric field.

There have been two kinds of prior art reflection type liquid crystal electro optical devices each of which utilize a twisted liquid crystal. One uses an optically uniaxial electro optical medium as a $\frac{1}{4}$ λ phase plate. The other is described in U.S. Pat. No. 4,019,807 and the Laid Open Patent No. 56-43681, wherein the liquid crystal with a twist angle of 45° to the molecular axis receives a direct polarized incident light applied slantingly and transmits it as an elliptically polarized light without any reflection under no electric field or is subjected to a birefringence under an electric field.

However, in the prior art reflection type liquid crystal electro optical devices, there have been problems in that tolerance is small for the thickness of a liquid crystal layer and display performance varies easily. Also, since the output displaying uniformity is lowered and is an elliptically polarized light, the loss in light increases.

Accordingly, an object of the present invention is to provide a reflection type electro optical device which reduces light loss (hereinafter referred to Δnd) and much margin in manufacture by optimizing the twist angle, the product of layer thickness and birefringence, and the incident polarized light angle.

Furthermore, another object of the present invention is to provide a reflection type liquid crystal electro optical device in which the optical characteristics is sharp in response to an electric field and which liquid crystal responds sufficiently to a small variation in p.m.s. voltage, whereby a so-called multiplex driving is possible.

Still another object of the present invention is to provide a reflection type liquid crystal electro optical device having a large effective picture element area in comparison with prior art active element type liquid electro optical device with active elements, for example, thin film transistors (hereinafter referred to TFT's) and metal-insulator-metal elements (hereinafter referred to MIM's).

Further, still another object of the present invention is to provide a projection type display apparatus in which the optical arrangement is simple, light utilization ratio is large and color reproductivity is superior.

SUMMARY OF THE INVENTION

In order to solve such problems, a reflection type liquid electro optical device according to the present invention is characterized in that in a reflection type liquid crystal electro optical device having a TN liquid crystal layer (hereinafter referred to TN) sandwiched between two plates facing to each other:

1. The TN liquid crystal layer receives a linearly polarized incident light, and turns it into a circularly polarized light at the reflection surface, and turns it into a linearly polarized light having a polarization rotated at 90° linearly to that of the direct incident light at the emitting surface after the reflection.

2. The TN liquid crystal layer received a linearly polarized incident light in parallel or vertically to the molecular axis at the incident surface, and turns it into a linearly polarized light with a polarization rotated at 90° to that of the incident light at the emitting surface after reflection.

3. The TN layer is conditioned in that the twist angle is approximately 63°, and the product of layer thickness and birefringence (hereinafter referred to as Δnd) has the relationship of $0.33\lambda \leq \Delta nd \leq 0.4\lambda$ (about 0.2 to 550 nm).

4. The TN layer is conditioned in that the twist angle is approximately 193°, and λnd has the relationship of $0.95\lambda \leq \Delta nd \leq 1.15\lambda$ (about 0.58 to 550 nm). The conditions of items 3 and 4 vary in accordance with the wavelength of incident light to be turned and in the range of the same functions.

5. The substrate forming the TN liquid crystal layer includes active elements each of which controls an electric field to drive a liquid crystal. In concrete examples, the active element may be a TFT matrix, a MIM matrix or a photo conductor.

6. The substrate having the active elements is a non-transparent semiconductive substrate.

7. The substrate having the active elements includes a driver circuit on the same substrate to distribute picture element information.

8. The substrate having the active elements is formed of active elements, signal transmission lines and reflective picture element electrodes.

9. The substrate having the active elements includes active elements and signal transmission lines. Inter insulator layers are formed thereon and reflective picture element electrodes are arranged thereon.

10. The other electrodes form the active elements and are reflective picture element electrodes.

11. A MIM element which functions as the active element is manufactured by the following steps.
   a. depositing one metal thin film for the MIM element on a substrate;
   b. processing the metal thin film in a stripe form;
   c. forming inter-layer insulator;
   d. exposing MIM element forming portion to be selectively oxidize; and
   e. depositing the other metal for the MIM element to form a picture element electrode electrically connected therewith.

A projection type display apparatus according to the present invention is characterized in the following:

12. A reflection type liquid crystal electro optical device includes a TN liquid crystal layer sandwiched between substrates. The TN layer receives a linearly polarized incident light. The layer turns the linearly polarized light into a circular polarized light at the reflection surface and turns it into a linearly polarized light having polarization rotated at 90° to that of the incident light at the emitting surface after reflection.

13. The plurality of reflection type liquid crystal electro optical device includes dichroic elements each of which has a wavelength separation function and a light synthesizing function. The wavelength separation function turns a readout light into a monochrome picture image with a wavelength corresponding to R, G and B, and illuminating it onto the plurality of the reflection type liquid crystal electro optical devices to form the picture image. The synthesizing step functions to synthesize a light corresponding to the wavelength of R, G and B reflected by the plurality of reflection type liquid crystal electro optical devices.

14. The dichroic element has two kinds of wavelength selection surfaces which are perpendicular to each other.

15. The plurality of reflection type liquid crystal electro optical devices include an erect equal magnification imaging optical system which projects an image from image supplying means onto a photoconductor.

As described above, since the device according to the present invention can make the $\Delta$nd value larger than that of the prior art device, a large margin in manufacture is obtained with respect to the thickness of liquid crystal layer. In addition, since the transmitted light is a linearly polarized light, the light loss is small in comparison with that of an elliptically polarized light transmitted from the prior art TN device with a twist angle of 45°.

Also, since a reflective display mode is used, active elements can be arranged under the picture elements, whereby a high aperture ratio (a ratio of an effective picture element area) is obtained without occupying an area for picture element address means (active elements). This leads to a reduced light amount loss.

Furthermore, an non-transparent substrate (for example, Si substrates) can be utilized to realize integration of peripheral circuits including functional circuits, driver circuits and the like. This makes possible the realization of a functional space light modulation element in addition to improved productivity and reliability.

Also, in the liquid crystal electro optical device, peaked reflection ratio can easily be adjusted by turning the monochrome wavelength of light with a dichroic prism and then projected it to the liquid crystal electro optical device. Hence, the chromaticity of a displayed image is improved and an image with a color close to natural color has been obtained.

BEST MODE FOR CARRYING OUT THE INVENTION

Example 1

Figure 1A:
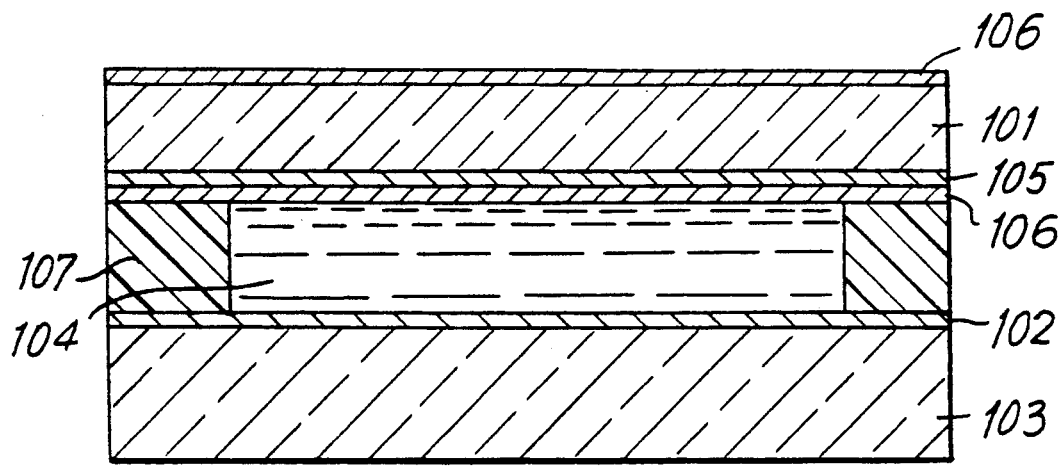
FIGS. 1(a) and 1(b) each is a cross-sectional view of a reflection type electro optical device according to the present invention.
Figure 1B:
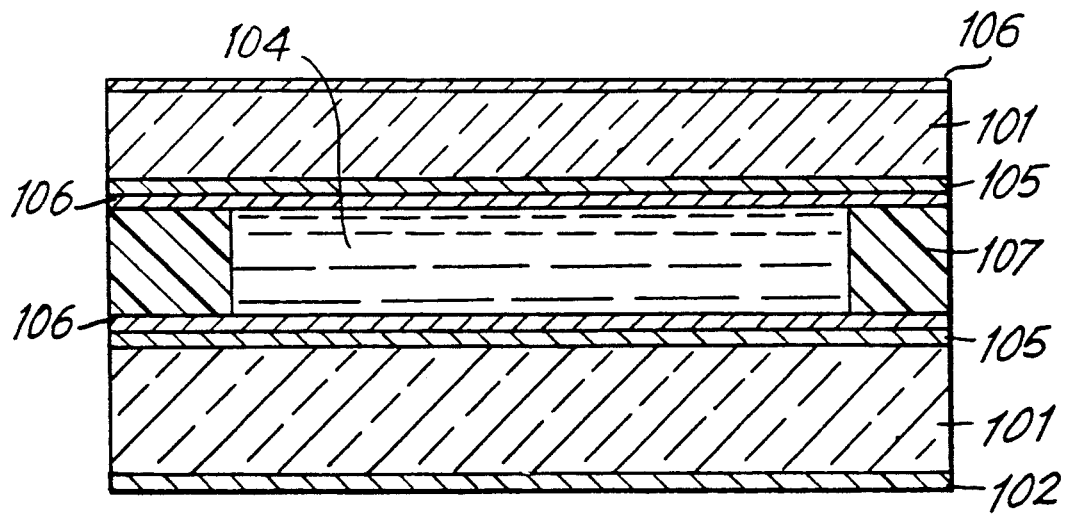

FIG. 1 is a cross-sectional view showing a reflection type electro optical device according to the present invention. In structure, a TN liquid crystal 104 is sandwiched between a transparent substrate 101 and an opposite substrate 103 coated with a reflective film 102. The transparent substrate is required to have no anisotropy optically. In this example, a glass substrate is used. Numeral 105 is a transparent electrode to apply an electric field across the liquid crystal layer. The other electrode is formed of a metal film and acts as a reflective film 102. A reflection decreasing coating 106 is formed over the surface of the transparent electrode and the light input (incident)/output (transmission) surface to suppress the reflection of unnecessary light. Numeral 107 is a spacer to support the substrate. FIG. 1(b) is a cross-sectional view showing a reflective film 102 formed over the outside of the opposite substrate 103. In this structure, any material giving an optical reflection may be used as a reflection film. In FIG. 1(b), other reference numerals may be applicable according to FIG. 1(a).

Figure 2:
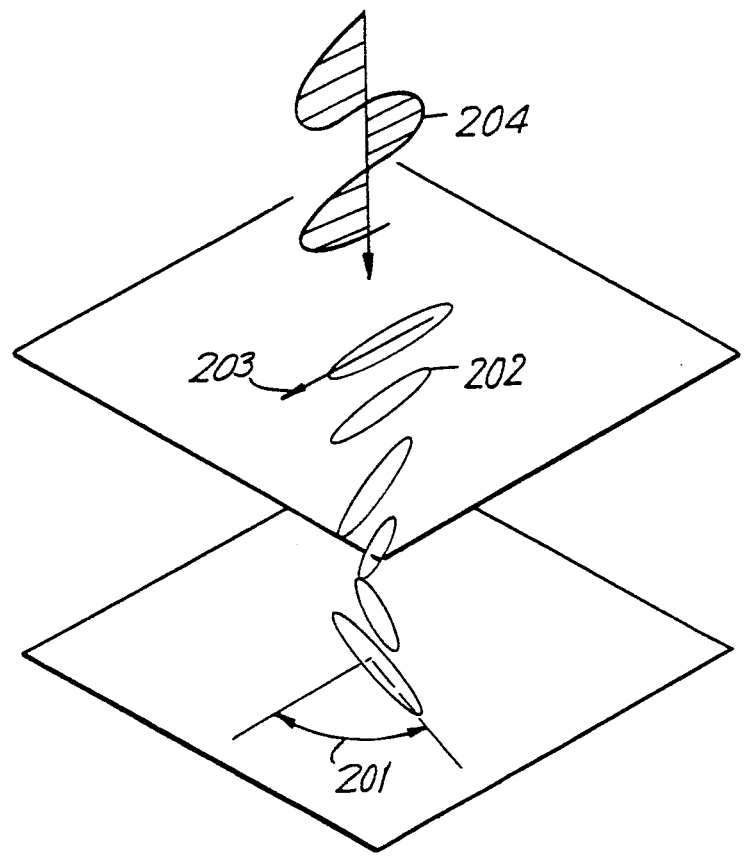
FIG. 2 is a perspective view showing orientation of a liquid crystal.

FIG. 2 is a perspective view showing an orientation of a liquid crystal. FIG. 2 shows that the twist angle 201 of a nematic liquid crystal layer is 63°, the product of the birefringence of a liquid crystal and the thickness of a liquid crystal layer is 0.2 ($\mu$m in unit, hereinafter referred to as "$\Delta$nd"). The incident light is polarized to a linearly polarized light by polarizers which is placed closely to one another. The polarized light is adjusted to a degree that an electric field oscillating surface 204 travels along the director 203 for the liquid crystal molecular 202 at the input side. That is, the molecules, when the applied voltage is zero, are oriented in parallel at the interface of the substrate, so as to provide an orientation of 63° between the upper and lower substrates as shown in FIG. 2. This orientation process may be imparted by rubbing and obliquely evaporating deposition or the like.

Likewise, if a twist angle is 193° and $\Delta$nd=0.58, a linearly polarized incident light turns into a circularly polarized light and after reflection, its polarized surface is rotated at 90° with respect to that of the incident polarization light at the input side.

Figure 3:
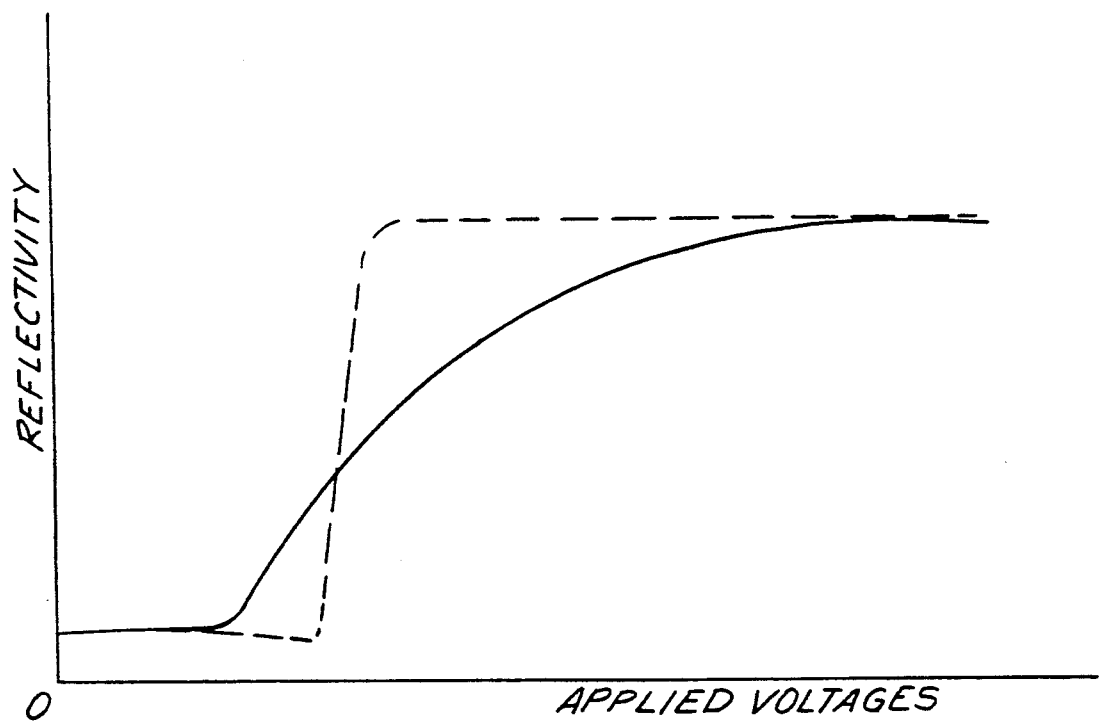
FIG. 3 is a graph showing the relationship between reflectivity and applied voltage for the device of FIG. 1.
Figure 4:
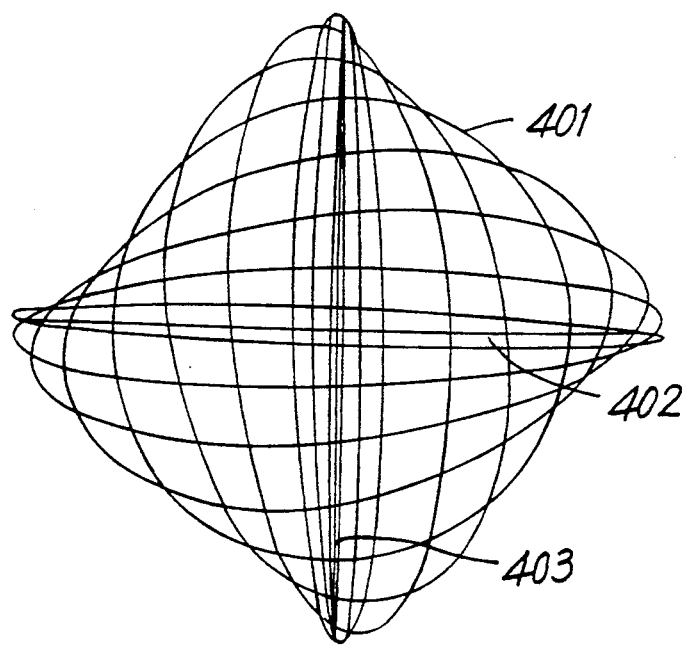
FIG. 4 shows the focus of the linear polarized light after it is rotated.

FIG. 3 is characteristic of reflectivity (550 nm) with respect to applied voltages for the device shown in FIG. 1. The solid line shows a 63° twisted case and the broken line shows a 193° twisted case. First let us explain a case where the voltage is zero. When a linearly polarized light 402 is applied, the locus of the elliptically polarized light is rotated, as shown in FIG. 4. At the reflection surface, the locus is nearly a circularly polarized light 401 and the phase is reflected back after being rotated by 180°. Again the light travels into the liquid crystal layer and is transmitted as a polarized light 403. Consequently, its polarization is rotated by about 90° at the output side. For this reason, the light is blocked by the polarizer, so that the reflectivity is decreased (in an off state). Next, let us explain a case where a voltage is applied. Molecules of a liquid crystal are reoriented in the direction of an electric field because of the anisotropy in dielectric constant. This removes the incident light and the birefringence, so that linearly polarized light is reflected back and transmitted out without any change. Hence, any decrease in reflectivity does not occur (in on state).

Such a change in polarized light occurs in a limited condition. This invention has been brought about as a result of a careful study on the condition. The liquid crystal layer is needed to have two optical characteristics One is that a linearly polarized light becomes a circularly polarized light after a single transmission. The other is that the circularly polarized light is reflected and that its polarization is rotated at 90° during the reverse transmission. FIG. 4 shows that an incident light twists at 63°.

Figure 5A:
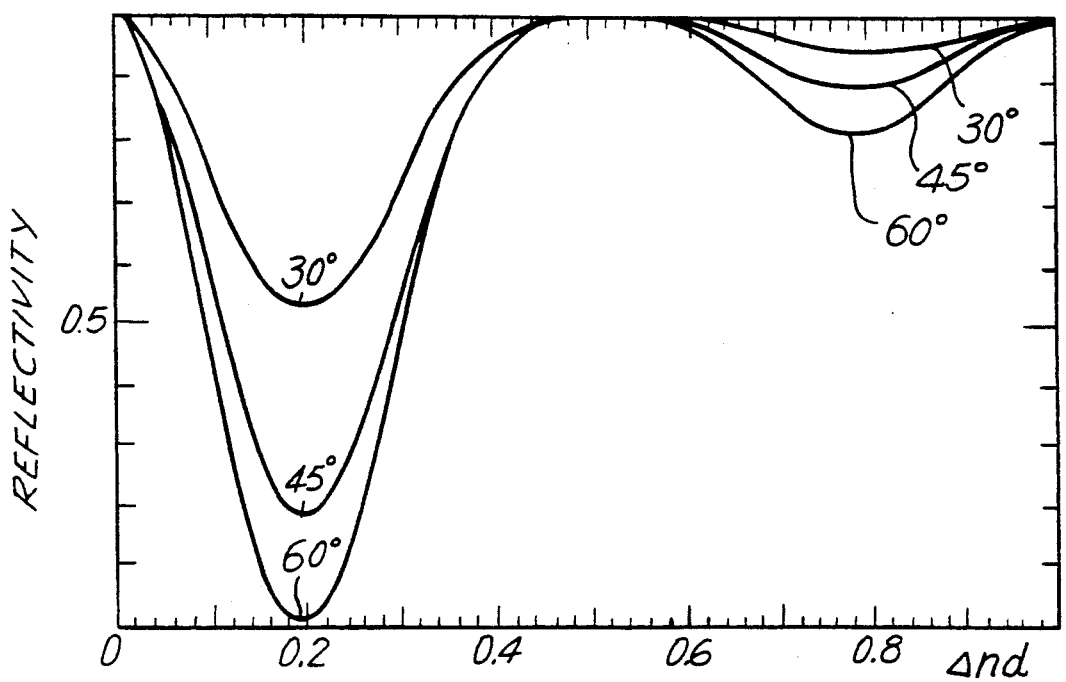
FIGS. 5(a), 5(b) and 5(c) each is a graph showing reflectivity between $\Delta$nd and off state.
Figure 5B:
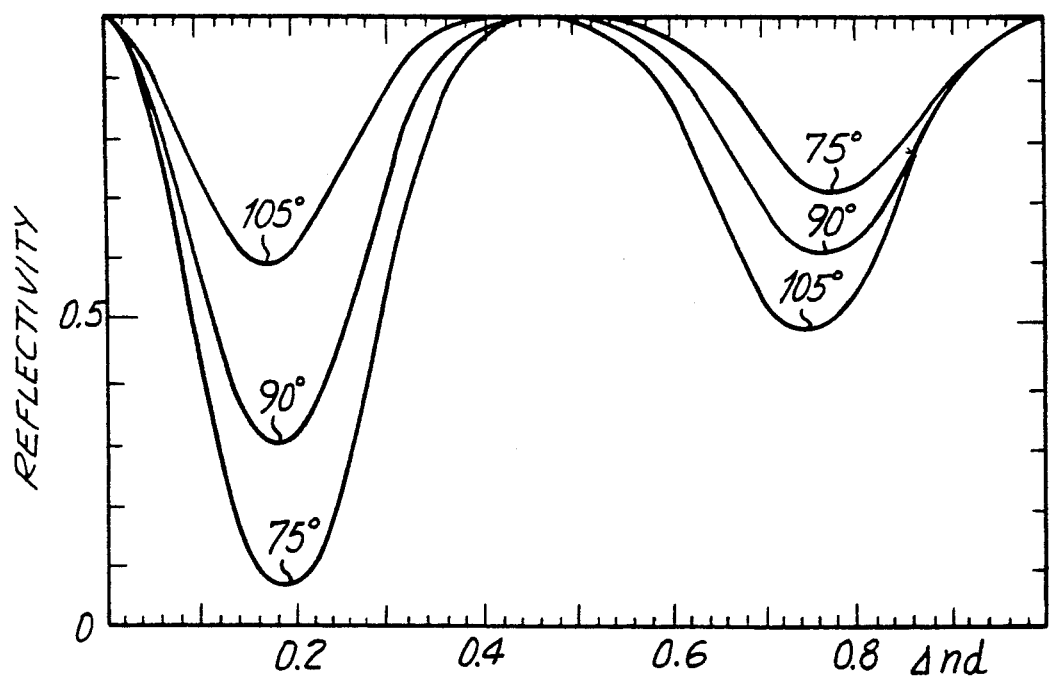
Figure 5C:
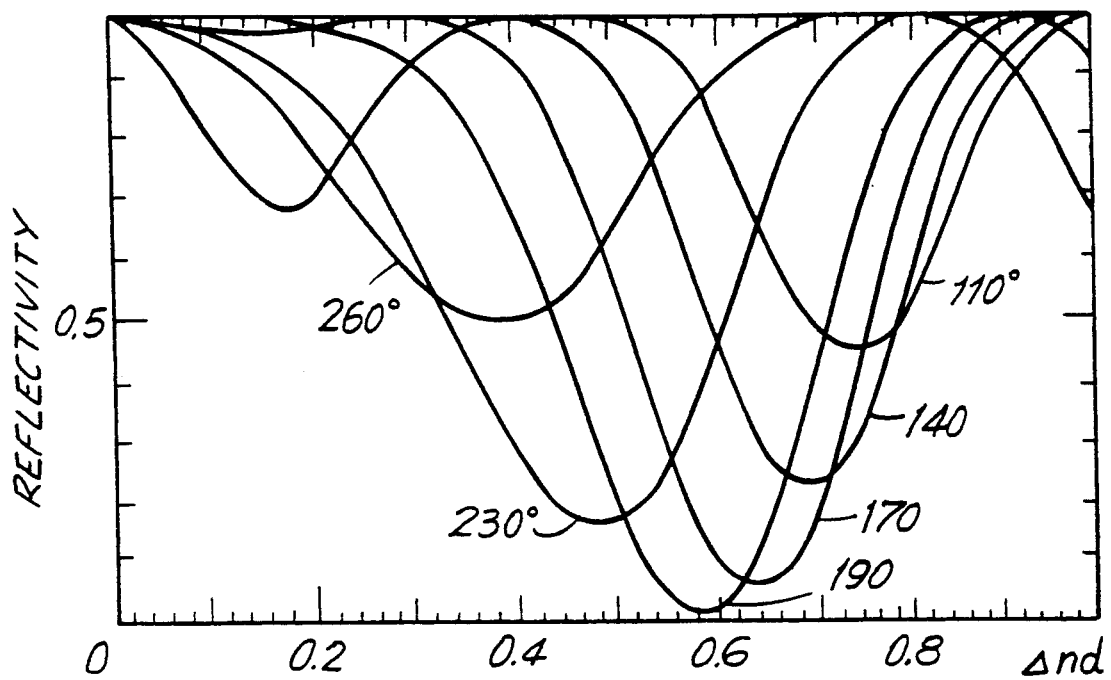

FIGS. 5(a), 5(b) and 5(c) are graphs each showing $\Delta nd$ and reflectivity at off state. The parameter is twist angle of the liquid crystal layer. The polarization of an incident light joins with the directors of the liquid crystal molecules at the incident surface.

The reflectivity in an "on state" is determined at a constant by the transmittance of a polarizer. This shows that when the twist angle is approximately 60° and $\Delta nd = 0.2$, the reflectivity approaches zero. A detailed examination exhibits that the optimum twist angle is 63°. Furthermore, another condition occurs when the twist angle is 190° and $\Delta nd$ is 0.6. In a more detailed examination, an optimum condition at a waveform of 550 nm is when the twist angle is 193° and $\Delta nd = 0.58$.

As shown in FIG. 4, the locus of the elliptically polarized light becomes a circularly polarized light at the reflection surface and is a linearly polarized light rotated at 90° with respect to light at the light output surface. In comparison with the use of a $\frac{1}{4}\lambda$ plate the polarized light the enters with the same direction as the director of a liquid crystal. This mode is characterized in that it is difficult to subject the light to a double refraction with a large $\Delta nd$ to be provided at the same birefringence phase change and a small periodic dependence $\Delta nd$. This leads to a relatively large thickness for a liquid crystal layer and a large margin in manufacture. This phenomena seems to be an electrically controlled birefringence in a twist structure (hereinafter abbreviated to TN-ECB).

Also, the $\Delta nd$ effect functions in a similar manner to the case that a linearly polarized light enters vertically to the director of the liquid crystal. The reason is that the $\Delta nd$ has no polarity.

Figure 6A:
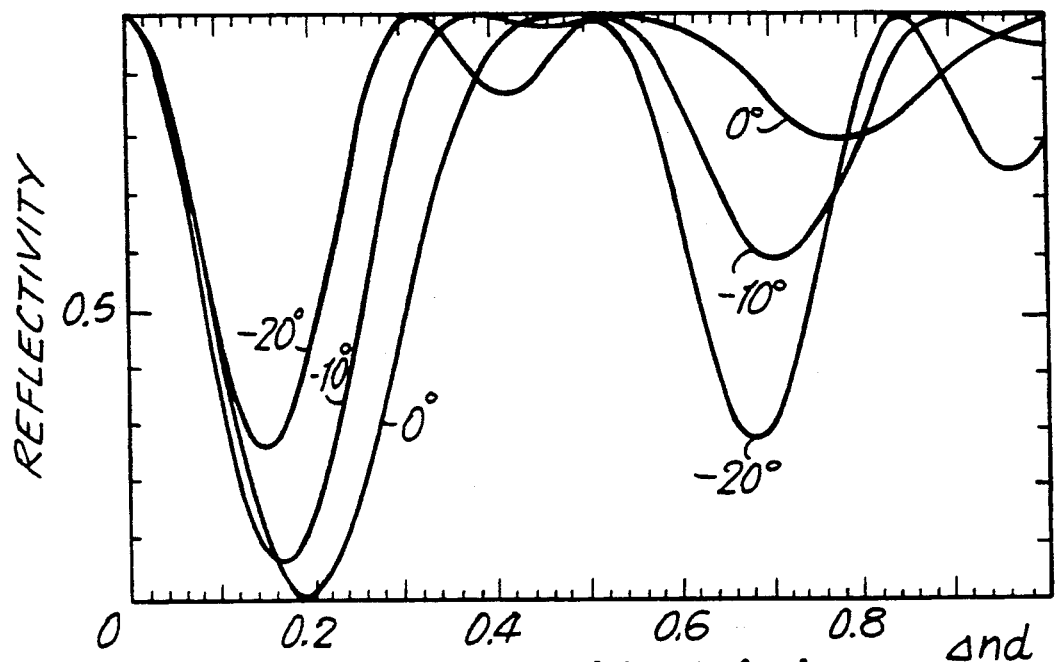
FIGS. 6(a) and 6(b) each is a graph showing the relationship between $\Delta$nd and reflectivity with an incident polarized light direction as a parameter.
Figure 6B:
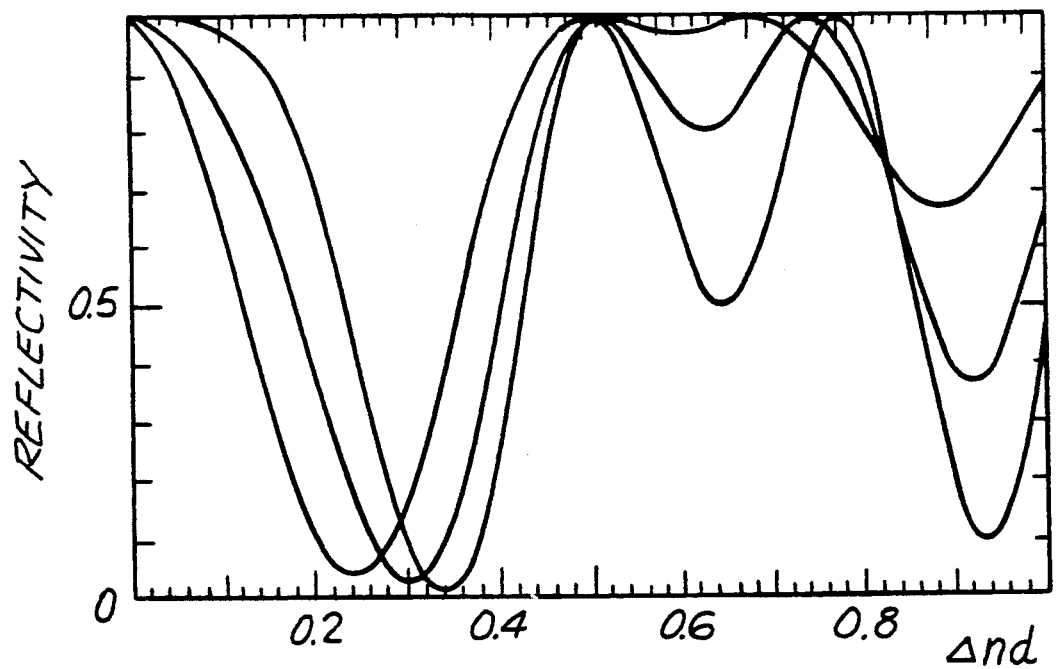

FIGS. 6(a), 6(b) and 6(c) show the relationship between $\Delta nd$ and reflectivity with a parameter being an arranged angle with respect to the director of a liquid crystal. According to this, there is a condition that the reflectivity is zero when the direction of the polarized light is at $+30°$. In this case, the locus of the elliptically polarized light is a circular polarized light at the reflection surface, as shown in FIG. 4.

Another condition will be found by taking different parameters. In this case, the minimum $\Delta nd$ has to be set to control low reflectivity variations due to wavelength. In an extreme small $\Delta nd$, since the thickness of the liquid crystal becomes too small, a suitable selection is needed. Since a reflection type device which has two fold optical distance has a small allowable variation in the thickness of a liquid crystal, there is a problem in manufacture, whereby a large $\Delta nd$ is required. This means that the margin in manufacture of the elements is wider. In reviewing the above described condition of $\Delta nd = 0.2$, d becomes 2.5 $\mu m$ in a liquid crystal with a typical small $\Delta nd$ ($=0.08$). On the contrary, in the prior 45° twisted type device mentioned before, the minimum thickness of the liquid crystal is less than 2 $\mu m$, thus degrading uniformity and manufacturing yield of the element.

As shown in FIG. 1, the front electrode type device which does not have any picture elements, may be used as an electrically controlled anti-glaring mirror for automobiles and light shutters. Particularly, in an application to an electrically controlled antiglaring mirror, a high reflectivity effect in a transparent state is recognized in comparison with the conventional dichroic pigment type device and the TN type device mounted with polarized plates on the both side thereof.

The low amount of light lost provides advantageous color images by using a color filter even under dim illumination, for example, a circumstance with no back light. This results from that the display glows brightly because the lower polarized light plate and the diffusion type reflection plate are not needed in the conventional TN type reflection liquid crystal element (in a transmission type mode in principle).

As shown by the broken lines in FIG. 3, a sharp optical response to voltage is obtaining at a large twist angle of 193°. In this case, the ratio SAT/VTH of an electric field with VTH at 90° reflectivity and an electric field SAT at 10% reflectivity is as value as 1.08. Hence, even if an electric field applied across the liquid crystal layer represents a small variation in effective value, the liquid crystal responds sufficiently and makes possible a display with high contrast. This shows that multiplex driving is possible with a XY matrix as well as conventional liquid crystal elements.

With the wavelength of a synchronized light, the conditions described in the present embodiment will be shifted. The ratio is approximately $\lambda$. For example, for a twist angle of 193°, the optimum value of $\Delta nd$ with respect to a wavelength of 550 nm is 0.58. However, if $\Delta nd = 0.45 \sim 0.75$ or $0.95\lambda \leq \Delta nd \leq 1.15\lambda$ ($\lambda$ in $\mu m$ unit), with respect to any wavelength with a visible ray, the reflectivity can be adjusted at its peak value. Also, in order to make the variations in performance at 550 nm to an off reflectivity of less than 10%, the $\Delta nd$ is 0.52 to 0.64 and the twist angle of the twist angle of the liquid crystal molecule is 175° to 210°. There are the same conditions at a twist angle of 60°. The $\Delta nd$ ranges from 0.14 to 0.25, or $0.33\lambda \leq \Delta nd \leq 0.4\lambda$. The twist angle is 53° to 78° for an off reflectance of less than 10%.

Example 2

Figure 7:
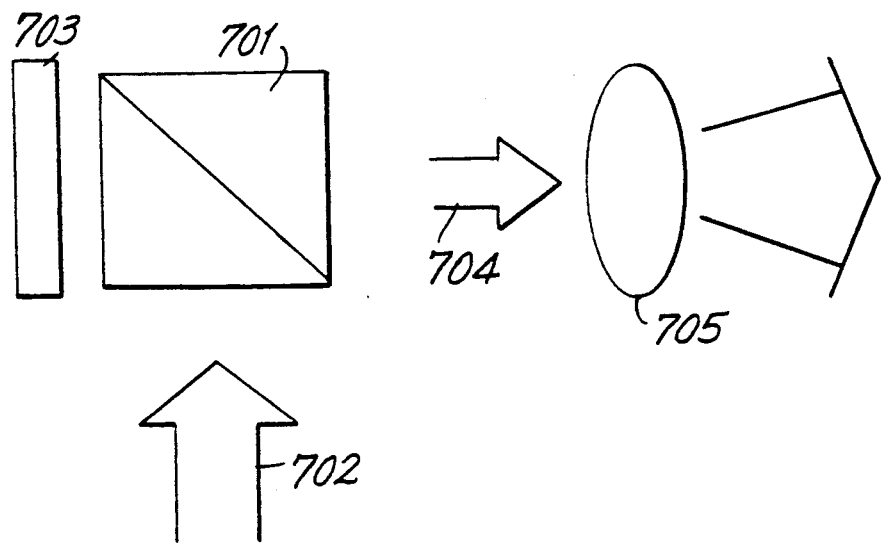
FIG. 7 is a structural diagram showing a reflection type liquid crystal electro optical device using a PBS as a polarizer.

FIG. 7 is a structural diagram of a reflection type liquid crystal electro optical device using a polarizing beam splitter (hereinafter referred to PBS) as a polarizer.

The PBS 701 polarizes directly a source light 702 to illuminate it onto the liquid crystal panel 703. In the structure of the liquid crystal panel, the light travelling process is the same as that of the embodiment 1. The PBS is a means for detecting a transmitted light and passes out a linearly polarized light which has a shifted angle of 90° with respect to the incident light. For this reason, the output light reflected is not stopped in an electric field, and the applied voltage to reflectivity characteristics is symmetric to the ordinate axis of FIG. 3 in the embodiment 1. The transmitted light 704 is projected with the projection optical system 705.

Example 3

Figure 8:
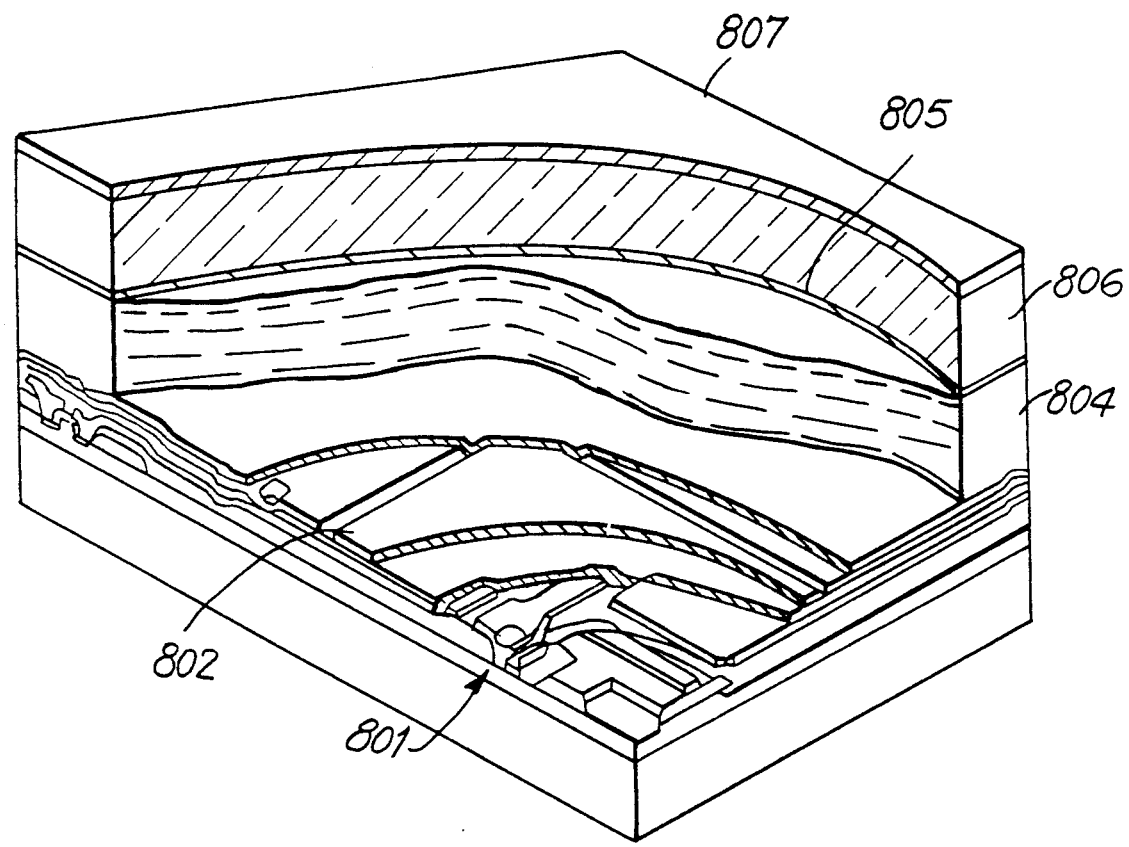
FIG. 8 is a cross-sectional view of a reflection type electro optical device addressed with TFT elements.

FIG. 8 is a cross-sectional view showing a reflection type electro optical device addressed by an active matrix. FIG. 8 shows an example arranging MOS transistors at each picture element. Numeral 802 is a picture element electrode, 804 is a liquid crystal layer, 805 is a transparent electrode formed by depositing onto the opposite transparent substrate 806, and 807 is a polarizing plate. The device used here is described in accordance with NIKKEI ELECTRONICS (1981) issued on February 16, on page 164. Table 1 shows the detailed specification.

TABLE 1

| | |
|---|---|
| Picture element number | 220 × 320 |
| Picture element pitch | 80 × 90 μm |
| Drive voltage | ±4V (on X side) |
| | 12 V (on Y side) |
| Display mode | TN-ECB Electrically controlled |
| Thickness of liquid crystal | 2.24 μm |
| Δnd | 0.2 |
| Twist angle | 63° |
| Substrate | Opaque semiconductor substrate (Si) |
| Reflection surface (Electrode) | Al (with over-coated SiO$_2$) |
| Process | CMOS |
| Picture element transistor | NMOS transistor |
| Gate | Poly-silicon |
| Shift register | Static |

With the use of the reflection display mode, as shown in FIG. 8, the metallization (wirings) and active elements are able to be arranged under the picture elements. This arrangement provides a large aperture ratio (opening ratio) of a picture element (or actual picture element) to the picture element area in spite of the existence of metallization and active elements, thus preventing a decrease in the opening area due to an increasing number of picture elements.

Figure 10:
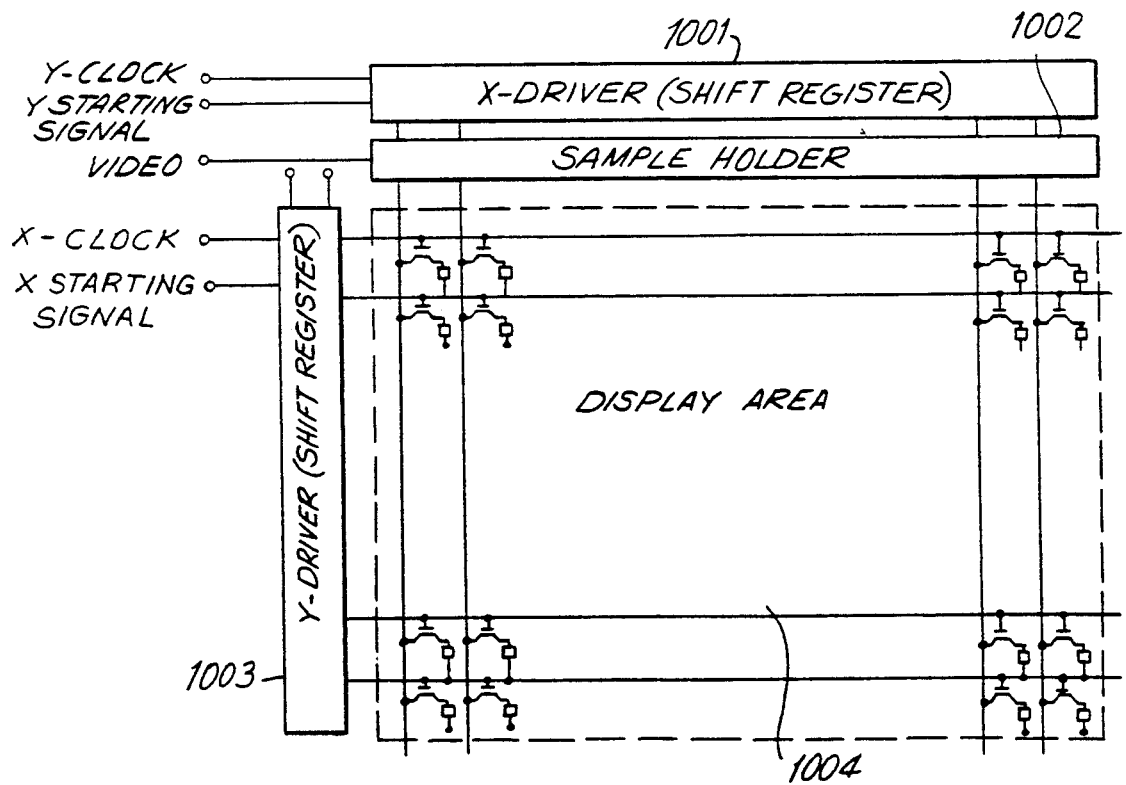
FIG. 10 is a structural view of a reflection type electro optical device incorporating peripheral circuits.

Furthermore, in addition to picture image elements and active elements, driving peripheral circuits such as shift registers and the like for distributing picture element information can be incorporated on the same Si substrate. FIG. 10 is a structural diagram. On the X side, a 320-stage shift register 1001 and a sample holder 1002 are formed and on the Y side, a 220-stage shift register 1003 is formed round the display area 1004. These are formed by a CMOS manufacturing process.

In the transparent type structure, a limitation to the width of wiring arises as the aperture ratio is increased. According to the present invention, since metal wiring of low resistance can be arranged under the picture element electrodes without any limitation on a circuit design rule, the drop of a transmission band width range due to wiring resistance is prevented.

Also, in comparison with other liquid crystal display modes, the device of the present invention has lower light amount loss than a guest/host type device. The device of the present invention does not require any polarizer and diffusion type reflection plate on the lower side of a prior art TN type reflection liquid crystal element. For this reason, a bright color picture image is obtained under dim light, using color filters.

The thin liquid crystal enables to increase advantageously the holding capacitance of the liquid crystal layer.

Furthermore, the reflection type device has an advantage that a heat sink and a temperature controller can be mounted on the opposite surface because the light input surface acts as the light output surface.

A sharp threshold characteristic to electric field is obtained by varying the twist conditions, so that a display with a high contrast is possible without making the switching ratio of the transistor large. In the embodiment, MOS transistors are used on a Si substrate. However, TFT transistors may be operated in place of the MOS transistors.

Example 4

Figure 9:
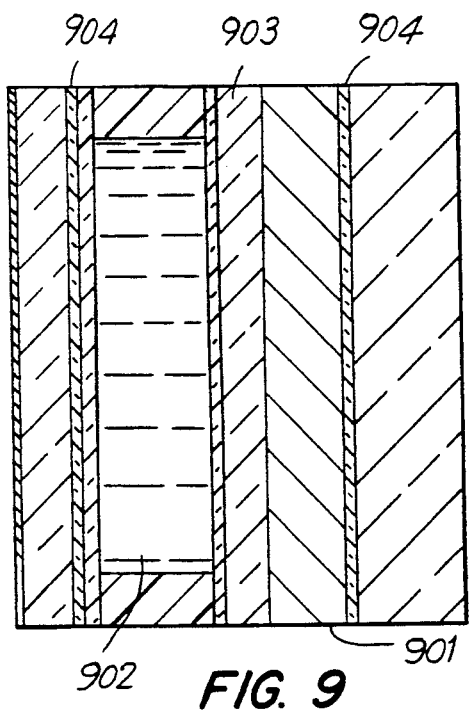
FIG. 9 is a cross-sectional view of a reflection type electro optical device of the type written with light.

FIG. 9 is a cross sectional view of a reflection type electro optical device which is written by means of light. A photoconductive layer 901 varies its resistance in response to light to control the electric field across the liquid crystal layer 902. Numeral 903 is a reflection mirror in a dielectric mirror structure. Numeral 904 is a transparent electrode to apply an electric field. Such device is disclosed in Laid Open Japanese Patent No. 56-43681 and the paper (J. Opt. Soc. Am., Vol. 70, No. 3,287 (1980)). However, the device according to the present invention uses two conditions: one being Δnd of 0.2 and a twist angle of 60° and the other being Δnd of 0.53 and a twist angle of 180°. This enables high off-reflectivity in an optimum arrangement of PBS.

Table 2 shows a detailed specification. In the embodiment according to the present invention, an intrinsic amorphous silicon with a small amount of boron is used as a photoconductive layer. However, a PIN structure may be used. Also, CdS, Se, OPC, monocrystaline silicon, BSO or the like is a good material for the photo conductive layer.

Varying the twist conditions makes the threshold characteristics sharp and enables a high contrast display even if the switching ratio of the photoconductor is small.

TABLE 2

| | |
|---|---|
| Photoconductor | a-Si by plasma CVD process (A small amount of boron doped intrinsic) |
| Dielectric mirror | Si/SiO$_2$ dielectric multi-layer mirror |
| liquid crystal | TN-ECB (Electrically controlled birefringence) turned at 550 nm |
| Pralizing means | PBS |
| Transparent substrate | Corning 7059 glass |
| Transparent electrode | ITO (Indium Tin Oxide) Spattered film |

Example 5

Figure 11:
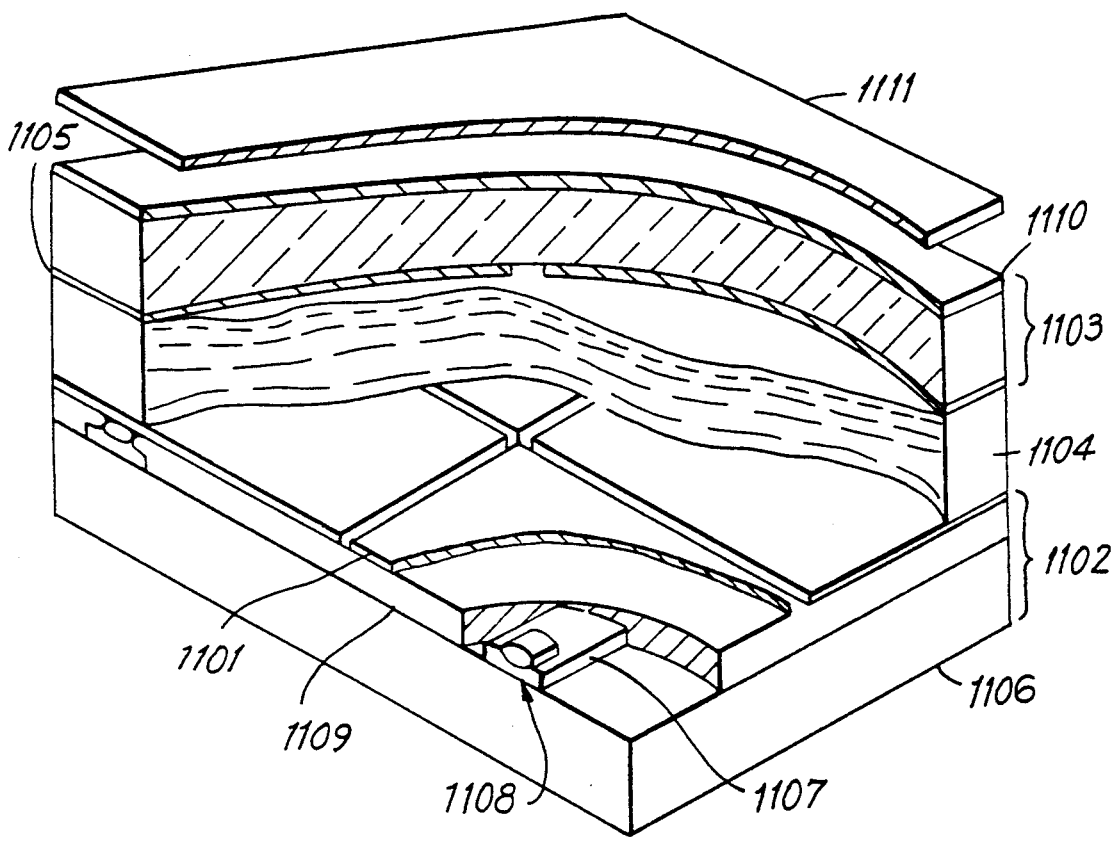
FIG. 11 is a cross-sectional view of a reflection type liquid crystal electro optical device using MIM elements.
Figure 12D:
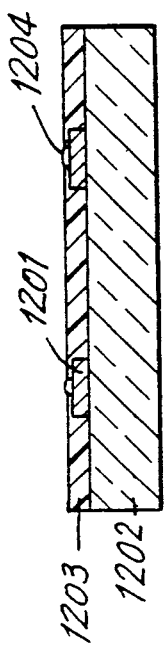
FIG. 12(a), 12(b), 12(c), 12(d) and 12(e) are flow diagrams for manufacturing.
Figure 12E:
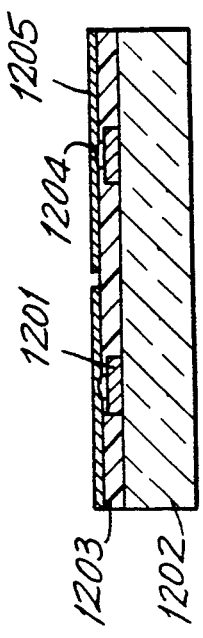
Figure 12A:
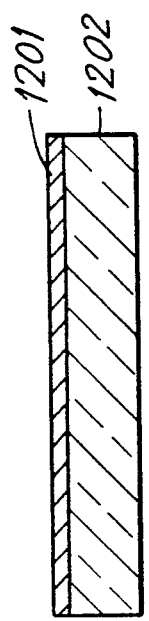
Figure 12B:
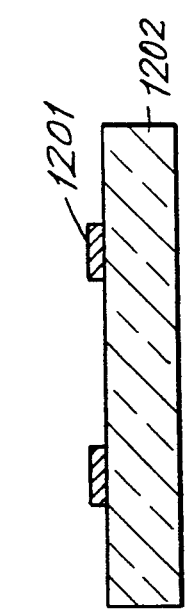
Figure 12C:
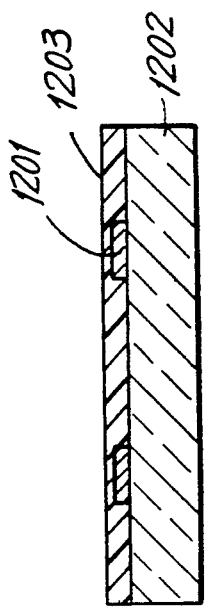

FIG. 11 is a cross sectional view of a reflection type electro optical device using MIM elements A liquid crystal 1104 is sandwiched between the MIM substrate 1102 and the opposite substrate 1103. The MIM substrate 1102 mounts a reflective picture element electrode 1101. Numeral 1105 is a transparent electrode for applying an electric field across the liquid crystal layer.

The electrode 1105 is in a form of a stripe corresponding to the picture element size. The MIM substrate comprises a signal transmission wiring 1107 in line form over a substrate 1006, a MIM element 1108 of a thin insulator formed on a portion of the wiring 1107 and a picture element electrode 1101 electrically connected to the MIM element.

The picture element electrode also can act as the other metal thin film of the MIM element and a reflective film of an electro optical element. Numeral 1110 is an anti-reflection coating and 1111 is a polarizing element.

Table 3 shows a more concrete specification.

TABLE 3

| GENERAL | |
|---|---|
| Picture element number | 220 × 320 |
| Picture element pitch | 80 × 90 μm |
| MIM SUBSTRATE | |
| MIM ELEMENT | Ta—Ta$_2$O$_5$—Cr |
| | Ta$_2$O$_2$ 500 Å |
| Oxidation process | Wet anodizing process |
| Signal transmission wiring | Ta |
| Picture element electorde | Cr reflection film |
| Layered insulator | Polyimide |
| DISPLAY MODE | TN-ECB (Electrically controlled birefringence) |
| Liquid crystal layer thickness | 2.4 μm |
| And | 0.2 |
| Twist angle | 63° |

With the use of such a reflective display mode, the wiring and the MIM elements can be mounted under the picture element electrodes, as shown in FIG. 11. This structure can make large the aperture ratio (opening ratio) of an actual picture element electrode to a picture element area in spite of the existence of wiring and active elements, thus preventing a decrease in an aperture ratio due to an increase in the picture element number.

In the transparent type device, the wiring width is limited due to an increase of an aperture ratio. However, in this invention, the transmission range does not degrade due to the wiring resistance because a thick metal wiring can be arranged under the picture electrode.

Also, the element mounting substrate does not use three terminal elements such as TFTs which need two or more crossed wirings, but uses only no crossed wiring, whereby a defect due to a short circuit between crossed wirings does not occur.

The reduced thickness of a liquid crystal increases advantageously the holding capacitance of the liquid crystal layer. An intrinsic semiconductor which has a larger band gap than that of a conventional semiconductor such as Si is used to provide essentially good light tolerance. The reflection type structure can seal completely a semiconductor portion of the element to incident light to improve more light tolerance.

Furthermore, the device according to the present invention provides lower loss in light amount in comparison with the guesthost type device. The device of this invention also has an advantage in that a bright color image is obtained under dim illumination using color filters because any polarizer and difuser which are put under the substrate and used for a prior art TN type reflection liquid crystal element (using a transparent mode in principle) are not used.

A sharp threshold characteristics in response to electric field is obtained by varying the twist condition so that a display with high contrast without making the switching ratio of a MIM element large.

As shown in FIG. 11, a reflection type display device is formed through a particular manufacturing process and has a different structure from a conventional MIM type element. Next, this manufacturing process will be explained. FIGS. 12(a), 12(b), 12(c), 12(d) and 12(e) are diagrams showing manufacturing steps.

a. A thin film 1201 of Ta, or one metal for a MIM element is deposited on the substrate 1202 (see FIG. 12(a)).

b. The Ta thin film is photo-etched off in a stripe (see FIG. 12(b)).

c. A layered insulator 1203 is coated (see 12(c)). In the example, a photosensitive polyimide is spin-coated, but may be used as an inorganic insulator.

d. A MIM element forming region is exposed with a photoetching process to selectively anodize. Here, a Ta$_2$O$_5$ 1204 of about 400 Å is formed with a wet process (see FIG. 12(d)).

e. A Cr 1205, or the other metal for the MIM element, is deposited in vapor phase, and then a picture element electrode is formed with photo etching (see FIG. 12(e)).

In this embodiment, in order to simplify the process, Cr, one metal for a MIM element, is used for a picture element electrode. In case of a need for a higher reflectivity, a film of Al, Ag or the like may be used effectively for the picture element electrodes.

Furthermore, in the patterning for the signal transmission line, the rule is eased to simplify the process.

Example 6

Figure 13:
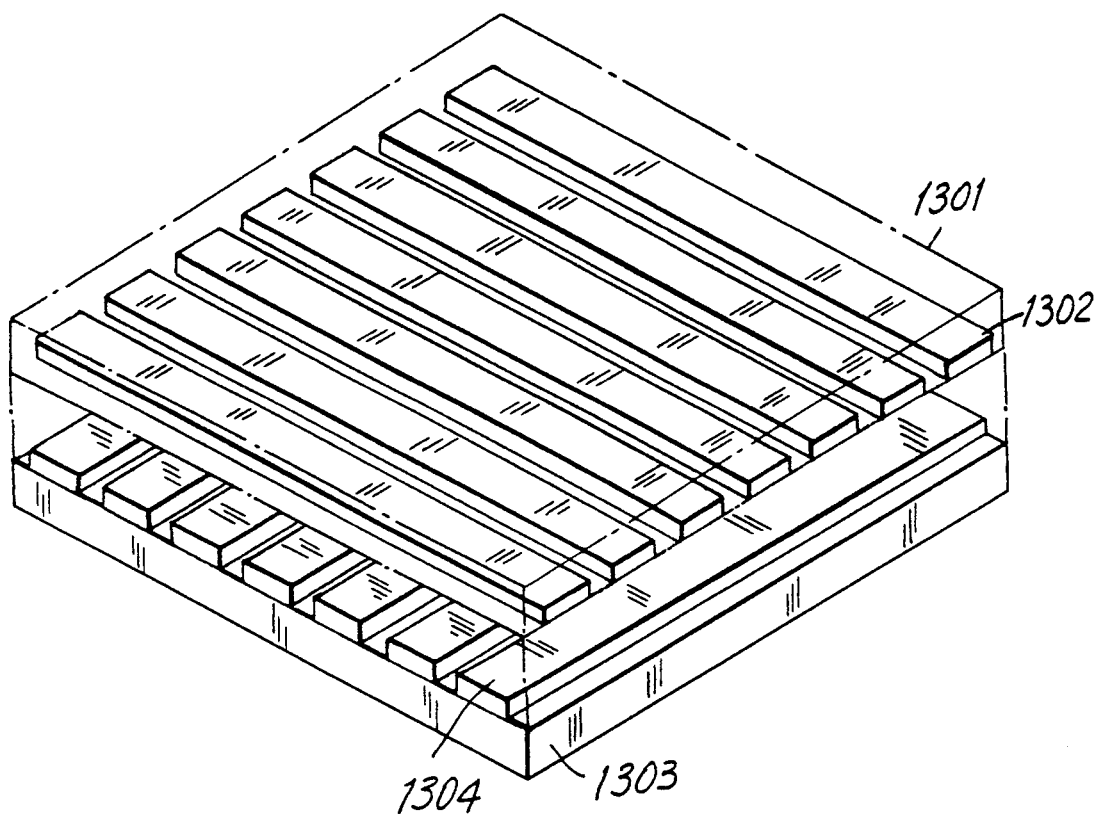
FIG. 13 is a cross sectional view of a reflection type electro optical device in XY matrix form.

FIG. 13 shows a simple X-Y matrix type liquid crystal panel using the reflection type liquid crystal electro optical device shown in the present embodiment. Numeral 1301 is a transparent substrate such as glass or the like. 1302 is a transparent electrode such as ITO. 1304 is an Al electrode on the opposite substrate 1303. Like the reflection type liquid crystal electro optical device shown in FIG. 1, the surfaces of the transparent 1302 and the Al electrode 1304 are provided with an orientation direction and a nematic liquid crystal is filled by means of a spacer therebetween. The condition to the thickness of the liquid crystal layer and to the twist angle of a liquid molecule is the same as that of the 193° TN described in the Example 1. Like a transparent type simple matrix liquid crystal panel, the liquid crystal molecule with a small twist angle provides low contrast when a number of picture elements are operated at a high duty drive operation. However, according to the reflection type liquid crystal electro optical device shown in the present embodiment, good contrast is provided because of its sharp threshold characteristics with in response to an electric field.

Example 7

Figure 14:
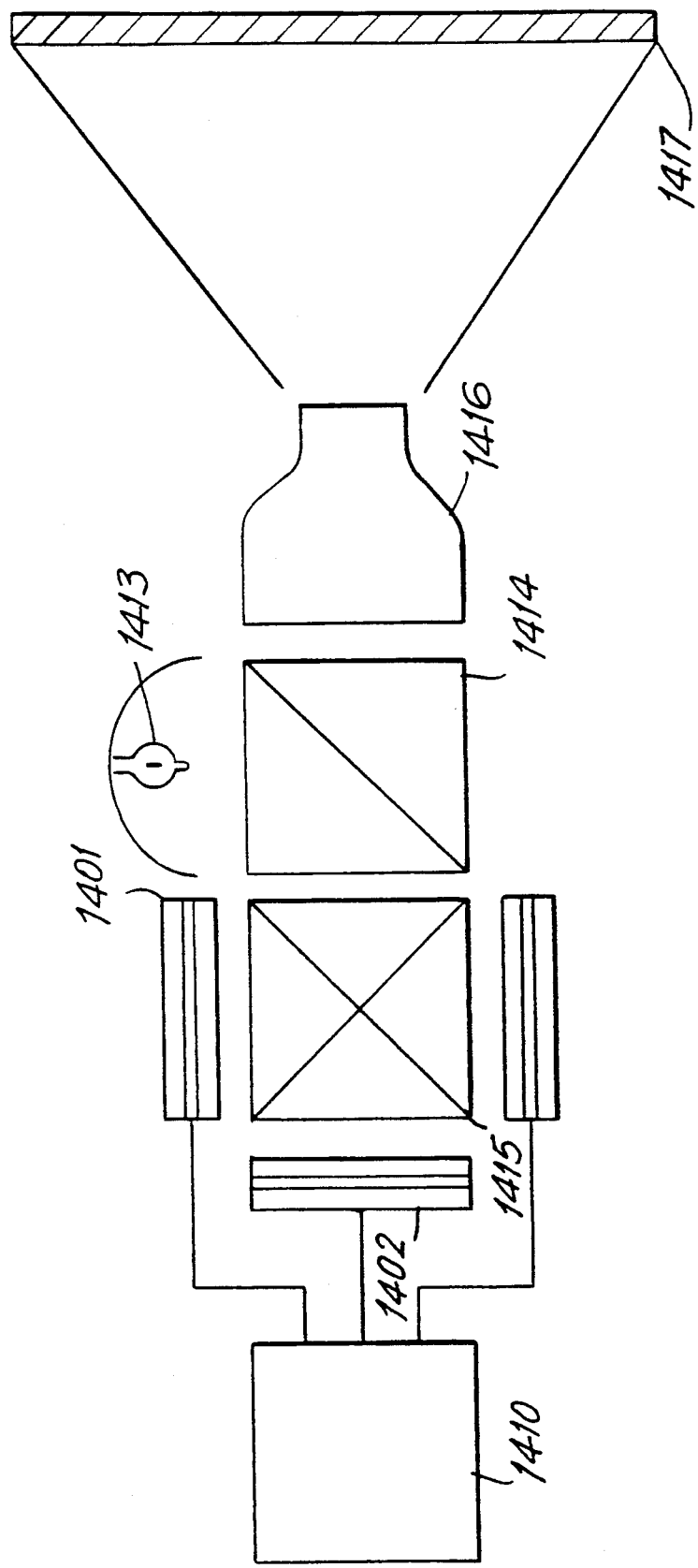
FIG. 14 is a structural diagram of a projection type display apparatus.

FIG. 14 is a structural diagram showing a projection type display apparatus using a plurality of a reflection type liquid crystal electro optical devices according to the present invention.

The reflection type liquid crystal electro optical device 1401, 1402 and 1403 may be formed with those shown in the Examples 1, 2, 3, 5 or 6. Here, a reflection type liquid crystal electro optical device using the transistors described in the Example 3 as a driving active element is utilized.

Numeral 1410 is a signal source for driving a reflection type liquid crystal electro optical device. After an image video signal is demodulated and then separated into a R signal, a B signal and a G signal, each of the signals is supplied to the corresponding one of the reflection type liquid crystal electro optical devices to display a monochrome image. As described in the embodiment 1, while a light applied on the liquid crystal layer is reflected back at the reflective film, it is subjected to retardation during transmission by the liquid crystal to form a picture image. In this way, a picture image corresponding to the R, G and B signal of a picture image to be displayed is formed on the corresponding one of the reflection type liquid crystal electro optical devices 1401, 1402 and 1403.

Numeral 1413 is a readout light source for visualizing the above picture image information, and for example, is a Xenon lamp, Halogen lamp, metal halide lamp, or the like. The readout light source with a reflector provides a high light utilization efficiency. A infrared filter may be added to isolate heat absorbed in the reflection type liquid crystal electro optical device and other optical components. An ultra violet cut filter may be added to prevent the degradation of the liquid crystal in a reflection type liquid crystal electro optical device. The readout light generated from the readout light source 1413 is separated into P and S polarized light with a polarized beam splitter 1414. FIG. 14 shows that an S polarized light component reflected by the polarized beam splitter is used for displaying. In the display of the P polarized light component, the above mentioned readout source may be replaced in position for a projection lens to be described later. The following conditions is completely applicable.

The polarized beam splitter 1414 desirably less good polarization characteristics over a whole range of visible light and sufficiently maintains sufficiently a whiteness of the light generated out of a light source. Light passing through the polarized beam splitter 1414 enters into the dichroic prism acting as a dichroic element, and is separated into three colors RGB. The monochromatic light is illuminated onto a reflection type liquid crystal electro optical device. The dichroic prism 1415 comprises four rectangular prism blocks combined with each other. A dielectric multi film is coated on the contact surface of each block and acts as two kinds of perpendicularly crossed wavelength separation surfaces. The dielectric multi film formed on one contact surface is designed so as to reflect a light of a wavelength corresponding to a red(R) in white light and so as to pass the remaining wavelengths of it. The dielectric multi layer formed on the opposite surface is designed so as to reflect a light of a wavelength corresponding to a blue (B) in the white light and so as to pass the remaining wavelengths of it. Hence, the light passed through the polarized beam splitter 1414 is separated in accordance with the wavelength with the dichroic prism 1415 and the reflected red (R) and blue (B) lights and the dichroic prism, the Δnd of each of the reflection type liquid crystal electro optical device is optimized. Furthermore, a detailed study on the conditions of the 193° TN showed clearly the relationship between a wavelength with a peaked reflectivity and Δnd, as shown in FIG. 16.

In a reflective liquid crystal electro optical device with a liquid crystal molecule of which the twist angle is set at 193°. FIG. 16 shows the reflectivity in the absence of an electric field measured with a polarized beam splitter. In FIG. 16, the solid line is a plot of a wavelength with respect to the Δnd's, with the wavelength providing a peaked reflectivity in the absence of an electric field. The center wavelength λ separated with the dichroic prism shown in the present embodiment is 630 nm in the liquid crystal reflective electro optical device 1402 for red. In the device 1402 for green, λ is 550 nm nm. In the device 1403 for blue, λ is 480 nm. Hence, if $0.95\lambda \leq \Delta nd \leq 1.15\lambda$, the influence on a color intensity of a picture image formed may be ignored. If $\Delta nd = 0.65$ in the device 1401, $\Delta nd = 0.58$ in the device 1402, and $\Delta nd = 0.50$ in the device 1403, each of the liquid crystal electro optical devices provides the highest reflectivity to the wavelength of a light applied and can display improved picture image in color reproductivity.

Figure 16:
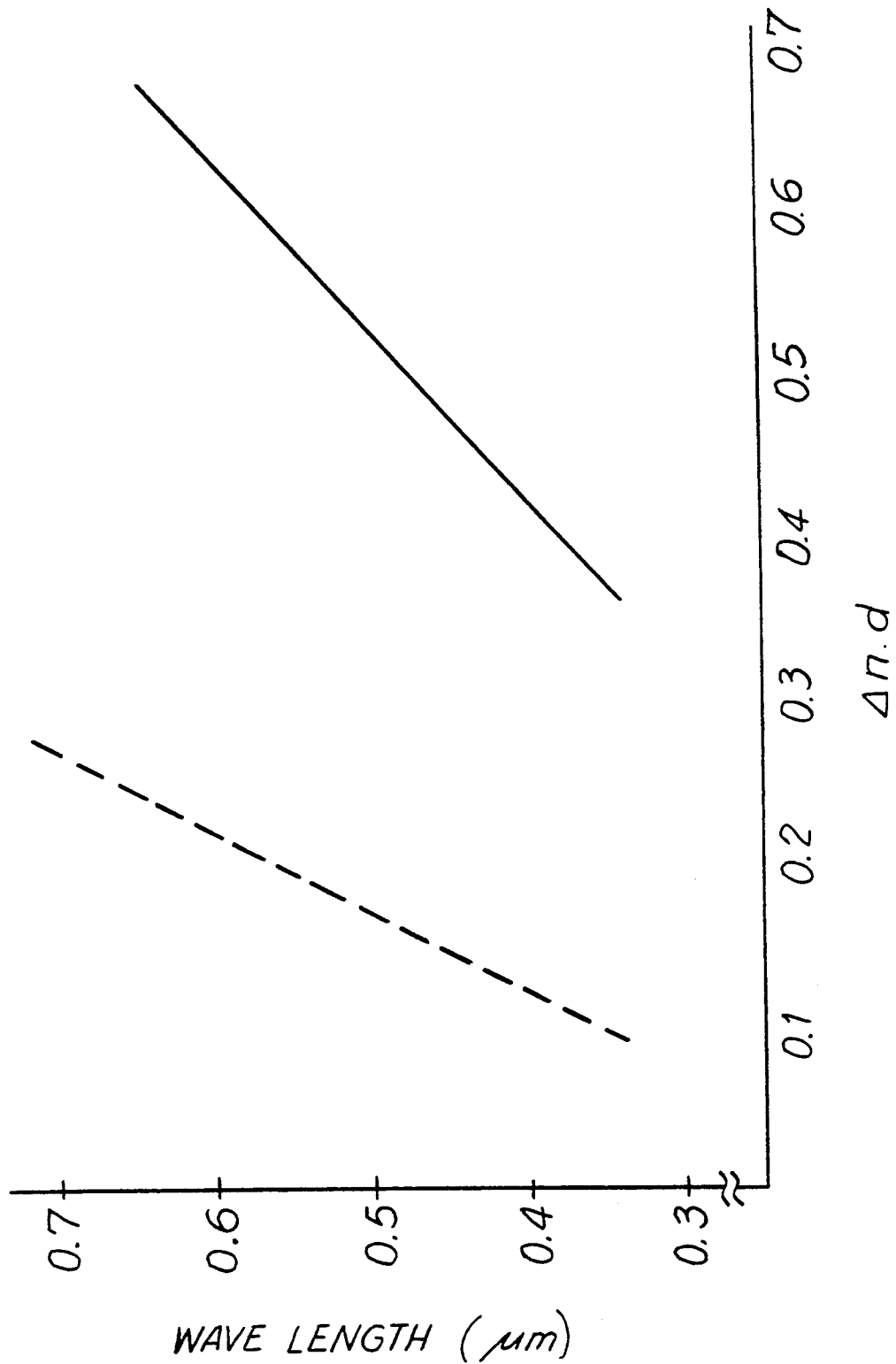
FIG. 16 is a diagram for a reflection type liquid crystal electro optical device showing the relationship between $\Delta$nd and wavelength $\lambda$ at which the reflectivity has a peak.

The broken line of FIG. 16 shows the relationship between a Δnd and wavelength with a peaked reflectivity, in a prior art liquid crystal reflective liquid optical device using liquid crystal molecules with a twist angle of 45°. In comparison with the reflection type liquid crystal electro optical device with the characteristics shown by the solid line, the above device has a peak wavelength for the reflectivity sensitive with respect to the Δnd variations, and has a gap margin for a liquid crystal layer for optimizing the reflection type liquid crystal electro optical device in accordance with the separation characteristics of the dichroic prism, whereby the color intensity of a displaying picture image is degraded. On the other hand, in the reflection type liquid crystal electro optical device according to the present invention, a variation in the peak wavelength for the reflectivity is moderate with respect to the Δnd variations, so that the optimization is easy.

Example 8

Figure 15:
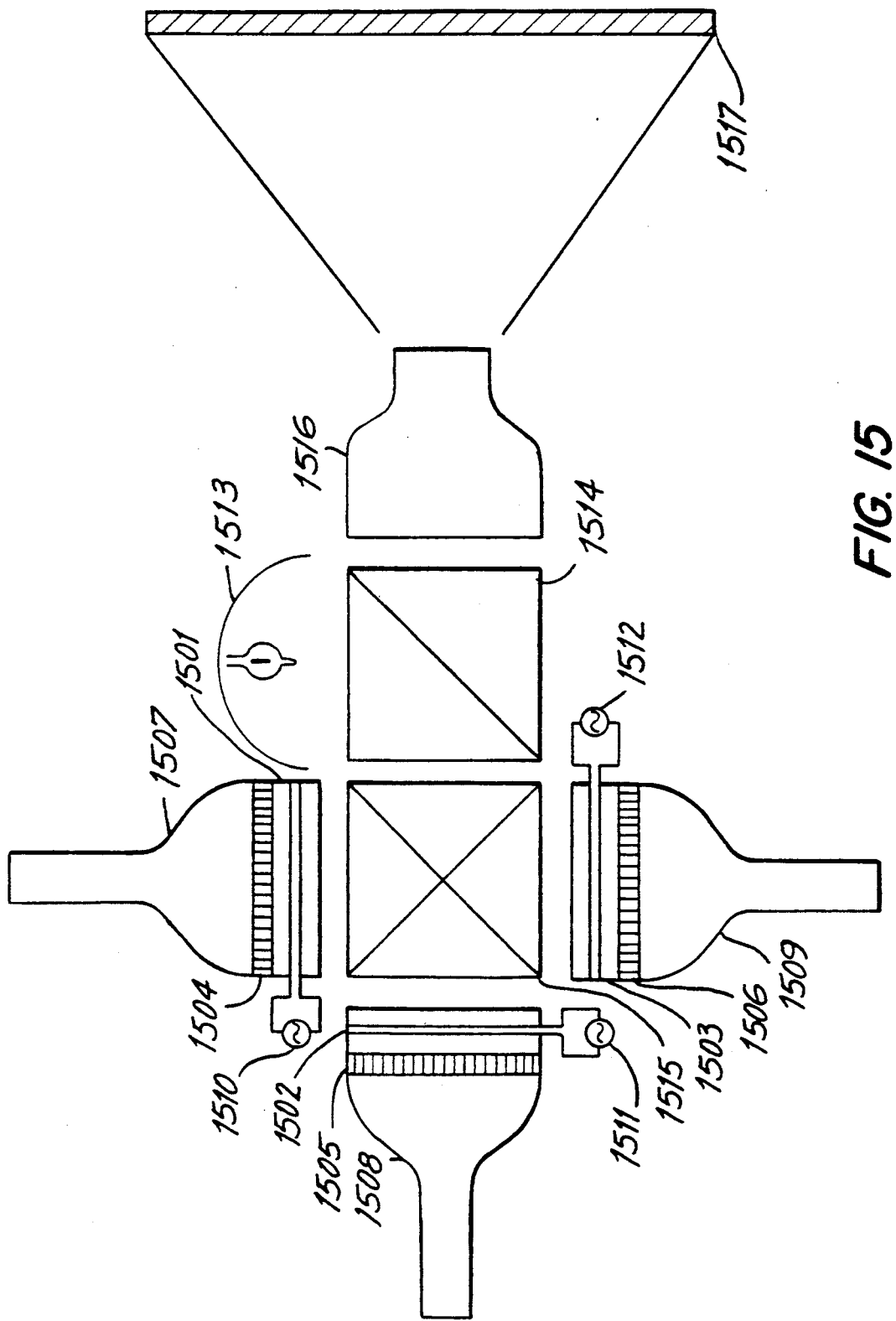
FIG. 15 is a structural diagram of a reflection type electro optical apparatus using a reflection type electro optical device addressed by CRT.

FIG. 15 is a structural diagram showing a projection type display apparatus using a plurality of a reflection type liquid crystal electro optical device addressed by a photo conductor.

The light recording type reflective liquid crystal electro optical devices 1501, 1502 an 1503 include a liquid crystal layer and a photo conductive layer and forms optically a picture image. They are shown in the Example 4, FIG. 9 and Table 2, respectively.

Numeral 1504, 1505 and 1506 are erect equal magnifying projection optical systems each of which couple optically a reflection type liquid crystal electro optical device with the screens of the cathode ray tubes 1507, 1505 and 1509 as picture image supplying means. In the specific example, a rod lens array of which a plurality of a refractive index distribution type rod lens is arranged in a plane is used. Instead of the rod lens array, coupling means using an erect equal magnifying projection optical system may be used which comprises a plurality of micro lens arrays. The lens array is formed of a plurality of horizontally arranged micro lenses each of which has refractive index distribution characteristics. Also, a fiber with a plurality of holes in a small diameter may be coupled with a fiber micro plate arranged horizontally.

Numerals 1510, 1511 and 1512 are a power supply for driving respective reflection type liquid crystal electro optical devices 1501, 1502 and 1503. The cathode ray tubes 1501, 1502 and 1503 display separately picture images based on picture image RGB signals from a video signal source (not shown). The picture image is guided to respective reflection type liquid crystal electro optical device by the above mentioned rod lens array to project onto a photo conductive layer. After different video signals supplied to different cathode ray tubes demodulate a common video signal in color to separate into RGB signals, each color is supplied to the cathode ray tube and a monochrome picture image of a component of each of the RGB signals is displayed on each if the cathode ray tubes.

Incident light on the photoconductive layer varies its impedance, so that the impedance ratio between the photoconductive layer and the liquid crystal layer varies As a result, the liquid crystal layer on which no electric field has been applied at the time when no illumination of light varies its orientation by being applied an electric field due to light illumination. As described in Example 1, while the light irradiated through the liquid crystal layer is reflected back by a dielectric multilayered mirror and emitted out, it is subjected to retardation to form a picture emitted image. In this way, the reflection type liquid crystal electro optical devices 1501, 1502 and 1503 display picture image information corresponding to the RGB signals of a picture image to be displayed, respectively. The projection optical system, which is the same as that in Example 7, comprises a readout light source 1513 for visualizing the above mentioned picture image information, a polarizing beam splitter 1514, a dichroic prism 1515 as a dichroic element a projection lens 1516 and a screen.

In the electro optical system using the projection type display device shown in the present embodiment, the TN layer is used under the conditions described in the Example 7.

The present embodiment uses a cathode ray tube as means for writing a picture image onto the reflection type liquid crystal electro optical device. However, a laser beam modulated by a video signal may be written into a photoconductive layer by scanning in two dimension a polygon scanner, an acoustic optical modulator, a galvano scanner or the like. The present invention is applicable to a wide variety of reflective type photo control apparatus in addition to the present embodiments.

INDUSTRIAL APPLICABILITY

In comparison with a prior art device, the above described present in invention allows a large $\Delta nd$ value and a large margin to the thickness of a liquid crystal layer in manufacture. Also, the use of a nearly direct polarized light enables effectively low loss in light amount.

Also, since signal transmission lines and active elements can be arranged under the picture electrodes, the aperture ratio does not decrease due to the picture element driving means (such as TFTs), whereby the light amount loss is effectively decreased.

The reflective display mode enables the use of a non-transparent silicon substrate and can effectively integrate a peripheral circuit such as a driver circuit. This leads to a simple assembly, low cost and improved reliability. Also, since signal transmission lines and active elements can be arranged under the picture element electrodes, the light resistance and thermal conduction are effectively improved.

Furthermore, since signal transmission lines and active elements can be arranged under the picture element electrodes, the minimum dimension rule in manufacture can be relaxed to adopt effectively a simplified manufacturing process.

The variation in the twist condition allows control of the threshold characteristics with respect to electric field. The sharp transition of the threshold enables a secure response to a small change in the effective voltage value, a high duty driving of a simple matrix type liquid crystal panel, and a high contrast display of an active element type liquid crystal panel with a small switching ratio of a transistor of a MIM element. Moreover, a moderated threshold value allows for half tone display and eases handling a tone signal such as a video signal.

The low loss in light amount provides an advantage that a color picture image is obtained under dim illumination, for example, an atmosphere with no back light, by using a color filter. This is due to the fact that there is no need for a polarizing plate and diffusing plate used in a prior art TN type reflective liquid crystal element to provide a bright display.

According to the present invention since a peaked reflectivity of the liquid crystal electro optical device can be adjusted readily by varying the wavelength of a monochrome light with a dichroic element, color intensity of a display picture image is improved, and the obtained picture image is close to natural color. Also, an optimization in the twist angle of a liquid crystal molecule improves the contrast, the utilization of light flux of a light source light and the picture image quality.

In addition, the use of a large opening ratio improves the light flux utilization. The improved light flux utilization can decrease the light output of a light source and reduce temperature rises of a liquid crystal electro optical device due to incident light. Furthermore, this increases effectively the reliability and operational life of the liquid crystal electro optical devices and projection type display systems. The use of the reflection type liquid crystal electro optical device enables the spaces for illumination system and projection system to be shared, and can realize a compact optical system.

We claim:

1. A reflection type liquid crystal display device, comprising:
    twisted nematic liquid crystal means for changing linearly polarized light into circularly polarized light and circularly polarized light into linearly polarized light;
    reflecting means for reflecting circularly polarized light received by said twisted nematic liquid crystal means toward the latter; and
    polarizing means for linearly polarizing light passing therethrough;
    wherein light incident to said device is received by said polarizing means and changed into linearly polarizing light having a first polarizing axis which after propagating through said twisted nematic liquid crystal means in a forward direction and being reflected as circularly polarizing light by said reflecting means propagates through said twisted nematic liquid crystal means in a reverse direction and is emitted by said polarizing means as linearly polarized light having a polarizing axis rotated by approximately 90° from said first polarizing axis.

2. The reflection type liquid crystal electro optical device according to claim 1, wherein said twisted nematic liquid crystal means includes twisted nematic liquid crystal molecules having molecular axes and an incident surface, said molecules at the incident surface being oriented such that linearly polarized incident light travels in one of parallel and perpendicular directions through said molecules at the incident surface.

3. The reflection type liquid crystal electro optical device according to claim 1, wherein said twisted nematic liquid crystal means has a twist angle of approximately 63° and a product Δnd of thickness and birefringence ranging from 0.33λ to 0.4λ wherein λ is the wavelength in μm and wherein Δnd is about 0.2 at λ equal to 550nm.

4. The reflection type liquid crystal electro optical device according to claim 1, wherein said twisted nematic liquid crystal means has a twist angle of approximately 193° and a product Δnd of thickness and birefringence ranging from 0.95λ to 1.15λ wherein λ is the wavelength in μm and wherein Δnd is about 0.58 at λ equal to 550 nm.

5. The reflection type liquid crystal electro optical device according to claim 1, further including at least two opposing substrates wherein said twisted nematic liquid crystal means is sandwiched therebetween.

6. The reflection type liquid crystal electro optical device according to claim 5, further including active element means for controlling an electric field to drive the twisted nematic liquid crystal means, said active element means mounted on one of said substrates for sandwiching the twisted nematic liquid crystal means.

7. The reflection type liquid crystal electro optical device according to claim 6, wherein said substrate having said active element means mounted thereon is a non-transparent semiconductor substrate.

8. The reflection type liquid crystal electro optical device according to claim 6, wherein said substrate having said active element means mounted thereon includes driver circuit means for distributing picture element information on said substrate.

9. The reflection type liquid crystal electro optical device according to claim 6, wherein said substrate having said active elements means mounted thereon further includes active element means, signal transmission lines and reflective picture element electrodes mounted thereon.

10. The reflection type liquid crystal electro optical device according to claim 6, wherein said active elements means having said substrate mounted thereon further includes active elements means, signal transmission lines, a layered insulator formed on said signal transmission lines and a reflective picture element electrode formed on said layered insulator.

11. The reflector type liquid crystal electro optical device according to claim 6, wherein said active element means includes a reflective picture element electrode.

12. The reflection type liquid crystal electro optical device according to claim 6, wherein said active element means is a MIM element, said MIM element formed by the steps of:
a. depositing a metal film for the MIM element on the substrate;
b. processing said metal film in stripe;
c. arranging a layered insulator;
d. exposing a portion for forming the MIM element to oxidize; and
e. arranging another metal film for the MIM element, and then forming a picture element electrodes to be coupled electrically.

13. A projection type display apparatus for displaying a color picture image including a plurality of reflection type liquid crystal electro optical devices, each of said liquid crystal electro optical devices, comprising: a reflection surface, transmission surface and twisted nematic liquid crystal means for receiving linearly polarized incident light from said transmission surface and for turning said incident light into circular polarized light at the reflection surface, and after reflection, turning said circular polarized light into a linearly polarized light having a polarization rotated approximately 90° to that of said incident light traveling through the transmission surface.

14. The projection type display apparatus according to claim 13, further including a dichroic element having wavelength separation means and light synthesizing means, wherein said wavelength separation means is operable for reading different monochromes of light and for visualizing the different wavelengths of the picture images produced by said plurality of reflection type liquid crystal electro optical devices corresponding to red, green and blue lights, respectively, and wherein said light synthesizing means is operable for synthesizing the different wavelengths of the picture images.

15. The projection type display apparatus according to claim 14, wherein said dichroic element has two kinds of wavelength selection surface perpendicularly intersecting to each other.

16. The projection type display apparatus according to claim 13, further including an erect equal magnification imaging optical means and an image supplying means, said image supply means for producing an image, wherein each refleciton type liquid crystal electro optical device further includes a photoconductor and wherein said erect equal magnification imaging optical means for optically coupling said image from said image supply means to said photoconductor.

* * * * *